Nov. 24, 1925.

A. M. DAVIS

PISTON

Filed July 6, 1925

1,563,262

Alva M. Davis
INVENTOR

BY Victor J. Evans
ATTORNEY

WITNESS:

Patented Nov. 24, 1925.

1,563,262

UNITED STATES PATENT OFFICE.

ALVA M. DAVIS, OF SALT CREEK, WYOMING.

PISTON.

Application filed July 6, 1925. Serial No. 41,830.

*To all whom it may concern:*

Be it known that I, ALVA M. DAVIS, a citizen of the United States, residing at Salt Creek, in the county of Natrona and State of Wyoming, have invented new and useful improvements in Pistons, of which the following is a specification.

The object of this invention is to simplify an improved construction of pistons for internal combustion engines by dispensing with the usual rings, and providing, in lieu thereof, rings having inwardly flared surfaces for contacting engagement with outwardly flared surfaces adjacent to the ends of the piston, and wherein spring means influence the rings to such engagement to force the same outwardly with respect to the piston, and as a result to produce a piston construction in which the rings thereof will at all times properly engage with the walls of the engine cylinders.

The improvement further consists in other advantages and in the details of construction set forth in the following description, illustrated by the drawings and pointed out with particularity in the appended claim.

In the drawings:—

Figure 1:
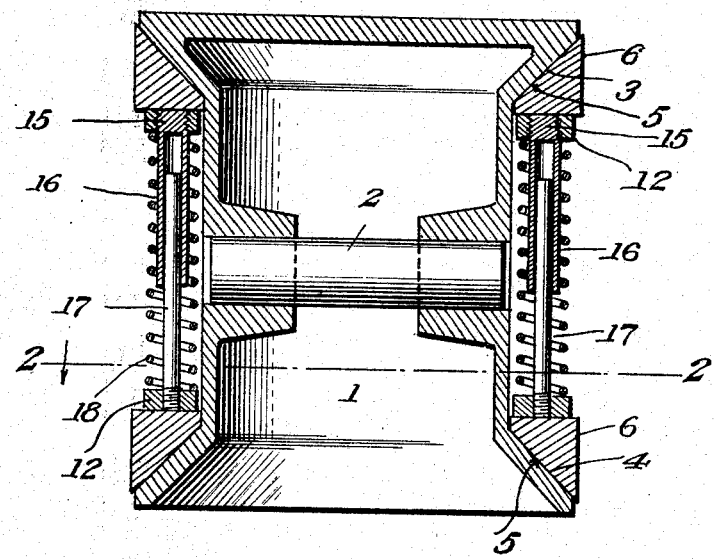
Figure 1 is a substantially central vertical longitudinal sectional view through the improved piston.
Figure 2:
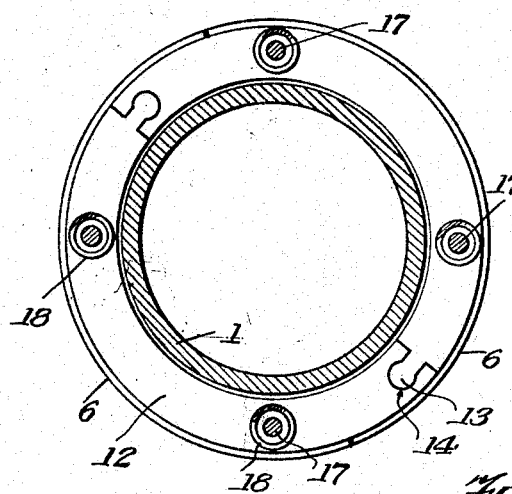
Figure 2 is a sectional view on the line 2—2 of Figure 1.

The piston comprises a hollow member and is broadly indicated by the numeral 1. The piston is provided with the usual inwardly directed bosses for the wrist pin 2. The piston, at the ends thereof, is flared outwardly to provide angle shoulders 3 and 4 respectively. On the shoulders 3 and 4 rest the inwardly flared portions 5 of piston rings 6. The piston rings 6 are of a thickness slightly greater than the distance between the body of the piston 1 and the outer walls of the shoulders 3 and 4.

Figure 3:
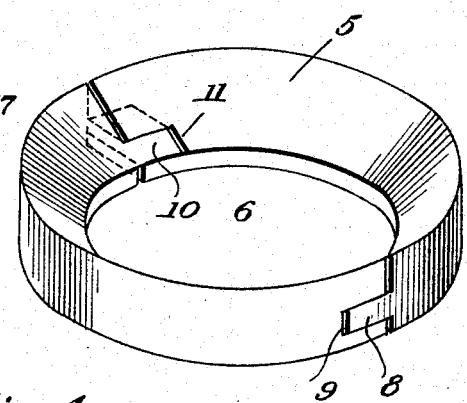
Figure 3 is a perspective view of one of the expansible rings.
Figure 4:
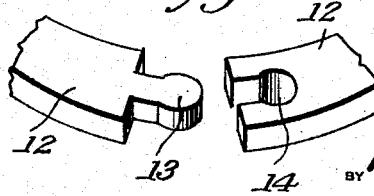
Figure 4 is a fragmentary perspective view to illustrate the meeting ends of the bearing members for the rings.

As disclosed in Figure 3 of the drawings each ring 6 comprises two sections having interior engaging lateral tongues and grooves 8 and 9, respectively. In addition to this the flared faces of each ring section, from its inner edge, is formed with a longitudinal tongue 10 that is received in a groove 11 in the cooperating section. By this arrangement leak-proof rings are provided.

Designed for contacting engagement with the inner flat faces of the rings 6 there are bearing members 12. Each of the bearing members 12 is constructed of two sections, one of which having a key-shaped extension 13 on one of its ends to be received in a keyhole slot 14 on the ends of the co-operating sections. By this arrangement it will be noted that the bearing members 12 may be readily arranged around the piston 1 to rest on the rings 6. One of the bearing members, preferably the upper bearing member 12, is provided with spaced threaded openings in which there is screwed the closed end 15 of tubular members 16. The lower bearing member 12 has screwed therein rods 17, and these rods are respectively telescopically received in the tubular members 16. Surrounding the tubes 16, and the rods 17, and exerting a pressure upon the opposed bearing members 12, there are helical springs 18. The pressure exerted by the springs forces the flared or inclined faces 5 of the ring 6 against the inclined walls of the shoulders 3 and 4, and consequently causes the rings to ride on the said shoulders and move the said rings outwardly with respect to the piston.

The improvement is of a comparatively simple construction, will insure ample cooperation and will prevent oil leakage. The invention is, of course, susceptible to such changes as fairly fall within the scope of what I claim.

Having described the invention, I claim:

A piston having outwardly flared shoulders adjacent to the ends thereof, piston rings having inwardly flared faces for engaging said shoulders, each of said rings comprising a plurality of sections having lateral and longitudinal interengaging tongues and grooves, annular members contacting with the inner faces of the rings, each of said members comprising a plurality of sections, interengaging means between the ends of the sections, depending tubes carried by one of said rings, upstanding rods on the other member received in the tubes, and helical springs surrounding the rods and tubes and contacting said members, for the purpose set forth.

In testimony whereof I affix my signature.

ALVA M. DAVIS.